United States Patent
Fleischer et al.

(10) Patent No.: US 7,280,526 B2
(45) Date of Patent: Oct. 9, 2007

(54) FAST AND SCALABLE APPROXIMATION METHODS FOR FINDING MINIMUM COST FLOWS WITH SHARED RECOVERY STRATEGIES, AND SYSTEM USING SAME

(75) Inventors: Lisa Karen Fleischer, Pittsburgh, PA (US); Iraj Saniee, New Providence, NJ (US); Frederick Bruce Shepherd, Summit, NJ (US); Aravind Srinivasan, Ellicott City, MD (US)

(73) Assignee: Lucent Technologies Inc., Murray Hill, NJ (US)

( * ) Notice: Subject to any disclaimer, the term of this patent is extended or adjusted under 35 U.S.C. 154(b) by 946 days.

(21) Appl. No.: 10/053,079

(22) Filed: Jan. 17, 2002

(65) Prior Publication Data

US 2003/0058798 A1 Mar. 27, 2003

Related U.S. Application Data

(60) Provisional application No. 60/262,410, filed on Jan. 18, 2001.

(51) Int. Cl.
*H04L 12/28* (2006.01)
*H04J 3/16* (2006.01)
*G01R 31/08* (2006.01)

(52) U.S. Cl. .................. 370/351; 370/468; 370/238

(58) Field of Classification Search .............. 370/238, 370/238.1, 218, 217, 225, 228, 237, 351, 370/216, 468, 220, 242, 395.21; 709/239; 701/202

See application file for complete search history.

(56) References Cited

U.S. PATENT DOCUMENTS 5,754,543 A * 5/1998 Seid .......................... 370/351
5,862,125 A * 1/1999 Russ .......................... 370/228
6,256,295 B1 * 7/2001 Callon ....................... 370/254
6,301,244 B1 * 10/2001 Huang et al. ............... 370/351
6,324,162 B1 * 11/2001 Chaudhuri .................. 370/225
6,363,319 B1 * 3/2002 Hsu ........................... 701/202

(Continued)

OTHER PUBLICATIONS

Jerram et al., MPLS in Optical Networks, "An Analysis of the features of MPLS and generalized MPLS and their application to Optical Networks, with reference to the Link Management Protocol and Optical UNI," Oct. 2001, 1-48.

*Primary Examiner*—Hanh Nguyen

(57) ABSTRACT

Broadly, techniques for solving network routing within a predetermined error are disclosed. These techniques may be applied to networks supporting dedicated reserve capacity, where reserved capacity on links in the network is dedicated for a particular commodity (generally, a source and sink pair of computers), and shared recovery, where reserved capacity on links is shared amongst two or more commodities. These techniques use an iterative process to determine flows on each of the links in a network. Costs are set for each commodity, and primary and secondary (i.e., backup) flows are initialized. A commodity is selected and demand for the commodity is routed through the shortest path. Costs are updated for each potential failure mode. For each commodity, the flows and costs are updated. Once all flows and costs are updated, then it is determined if a function is less than a predetermined value. If the function is less than a predetermined value, then the commodity selection, and flow and cost adjustments are again performed. If the function is greater than the predetermined amount, then the network routing problem is solved to within a predetermined amount from an optimal network routing.

22 Claims, 4 Drawing Sheets

U.S. PATENT DOCUMENTS

| | | |
|---|---|---|
| 6,542,469 B1 * | 4/2003 | Kelley et al. ............... 370/238 |
| 6,628,649 B1 * | 9/2003 | Raj et al. .................... 370/360 |
| 6,744,727 B2 * | 6/2004 | Liu et al. .................... 370/228 |
| 6,744,775 B1 * | 6/2004 | Beshai et al. ............... 370/409 |
| 6,914,912 B1 * | 7/2005 | Skalecki et al. ............ 370/468 |
| 6,928,484 B1 * | 8/2005 | Huai et al. .................. 709/239 |
| 2002/0038360 A1 * | 3/2002 | Andrews et al. ............ 709/223 |
| 2002/0186665 A1 * | 12/2002 | Chaffee et al. ............. 370/255 |

* cited by examiner

FAST AND SCALABLE APPROXIMATION METHODS FOR FINDING MINIMUM COST FLOWS WITH SHARED RECOVERY STRATEGIES, AND SYSTEM USING SAME

CROSS-REFERENCE TO RELATED APPLICATIONS

This application claims the benefit of U.S. Provisional Application No. 60/262,410, filed Jan. 18, 2001.

FIELD OF THE INVENTION

The present invention relates generally to network routing, and more particularly, to fast and scalable approximation methods for finding minimum cost flows with shared recovery strategies and systems using these methods.

BACKGROUND OF THE INVENTION

In a packet switching network, a packet of information is routed from a source to a destination by using a destination address contained in the packet. Packets of information are multiplexed onto network pathways. No particular path is reserved for data in a packet switching network, and a packet can generally take any path in the network. While a packet is not limited to any particular path, techniques exist for routing a packet based on certain criteria, such as speed, cost, distance, and Quality of Service (QoS).

An additional type of network that is becoming common is a label switching network. A label switching network runs in conjunction with a packet switching network, and uses labels placed into packets in order to route packets. Normal routing procedures for packet switching are disabled. A "tunnel" is created to connect a source with a destination. The appropriate labels are selected for packets emanating from the source and entering the network so that the packets follow the tunnel and end up at the destination. Label switching offers the benefit of providing tunnels for packets. Consequently, packets should arrive at the destination at more regular intervals, which is important in certain time-sensitive applications such as real-time audio and video.

Packet switching and label switching networks both are helped by methods that route demands on these networks. These methods can be used real-time, meaning that changes are made to the network in order to more efficiently route demands on the network, or can be used to determine when or how the network should be upgraded to support new demands. Problems with methods used to solve network routing are that they are complex and time-consuming. A need therefore exists for techniques that solve these problems.

SUMMARY OF THE INVENTION

Broadly, techniques for solving network routing within a predetermined error are disclosed. These techniques may be applied to networks supporting dedicated reserve capacity, where reserved capacity on links in the network is dedicated for a particular commodity (generally, a source and sink pair of computers), and shared recovery, where reserved capacity on links is shared amongst two or more commodities. These techniques use an iterative process to determine flows on each of the links in a network. As the flows for each link are modified, the costs for each link are also modified. The process continues to modify flows on links and costs for links until a network routing solution is determined that is within a predetermined amount of an optimal network routing. The network routing generally includes, for each link, a primary amount of flow that will normally flow on the link and a secondary flow that will be placed on the link should a failure occur in certain locations in the network. Once the network routing is determined, a process can configure the network in accordance with this routing, or a network administrator can use the network routing to determine when and how to upgrade the network.

In a first aspect of the invention, a technique is disclosed that performs the following steps. Costs are set for each commodity, and primary and secondary (i.e., backup) flows are initialized. A commodity is selected and demand for the commodity is routed through the shortest path. There are well known techniques for determining the shortest path that minimizes cost according to weights associated with the links. Due to certain assumptions in the present invention on the feasible paths for flows, shortest path computations are relatively easy. One extra complication, however, is that there are different edge costs associated to each failure mode. A failure mode comprises a given set of network elements. Typically, failure modes consisting of one link are generally modeled, but it may also be useful to protect against node failures or multiple failures. Network routing is achieved incrementally in rounds. Each round comprises sending flow for each commodity down its shortest paths (or pair of paths). These flows in turn affect the costs on the links, which in turn affects future choices of the shortest paths. After each round, a function is evaluated to check whether it is above a certain threshold. If so, the computation of an approximate solution has been completed.

In a second aspect of the invention, the technique of the first aspect is performed subject to a budget constraint. In a third aspect of the invention, capacity is reserved when determining appropriate network routing. In fourth and fifth aspects of the invention, the techniques of the present invention are used with Multi-Protocol Label Switching (MPLS) and Multi-Protocol Wavelength Switching (MPλS), respectively.

A more complete understanding of the present invention, as well as further features and advantages of the present invention, will be obtained by reference to the following detailed description and drawings.

DETAILED DESCRIPTION OF PREFERRED EMBODIMENTS

Broadly, techniques are presented for determining network routing. These techniques support dedicated reserve capacity, where reserved capacity on links in the network is dedicated for a particular commodity (generally, a source and sink pair of computers), and shared recovery, where reserved capacity on links is shared amongst two or more commodities. Basically, the techniques are given a set of demands as inputs. Each demand is a requested amount of capacity to be carried on the network. Demands are created between a source device and a destination device. The network lies betweens the source and destination devices and must be able to carry the demand, subject to certain criteria. One such criterion is generally some amount of extra demand so that communication between the source and destination can continue if a link failure or other failure occurs over the primary path chosen for the link. This extra demand will be routed over a secondary path. The outputs of the techniques include the determined primary and secondary demand for each link in the network.

The techniques of the present invention may be used during real-time, which means that the primary and secondary demands determined as a network routing solution may be used to configure the network to actually route the determined demands. This is particularly true because the iterative methods of the present invention allow fairly fast convergence to a network routing solution, even for very large networks. Alternatively, the determined demands may be used to determine how or when to upgrade the network. For example, a network administrator may know that the current demand but may desire to know what the desired capacity or cost will be if the demand increases by a certain percentage. If the network administrator has data showing the approximate bandwidth increase per year, for example, for the network, the administrator can then determine when the capacity of the network will need to be increased based on the data.

Figure 1:
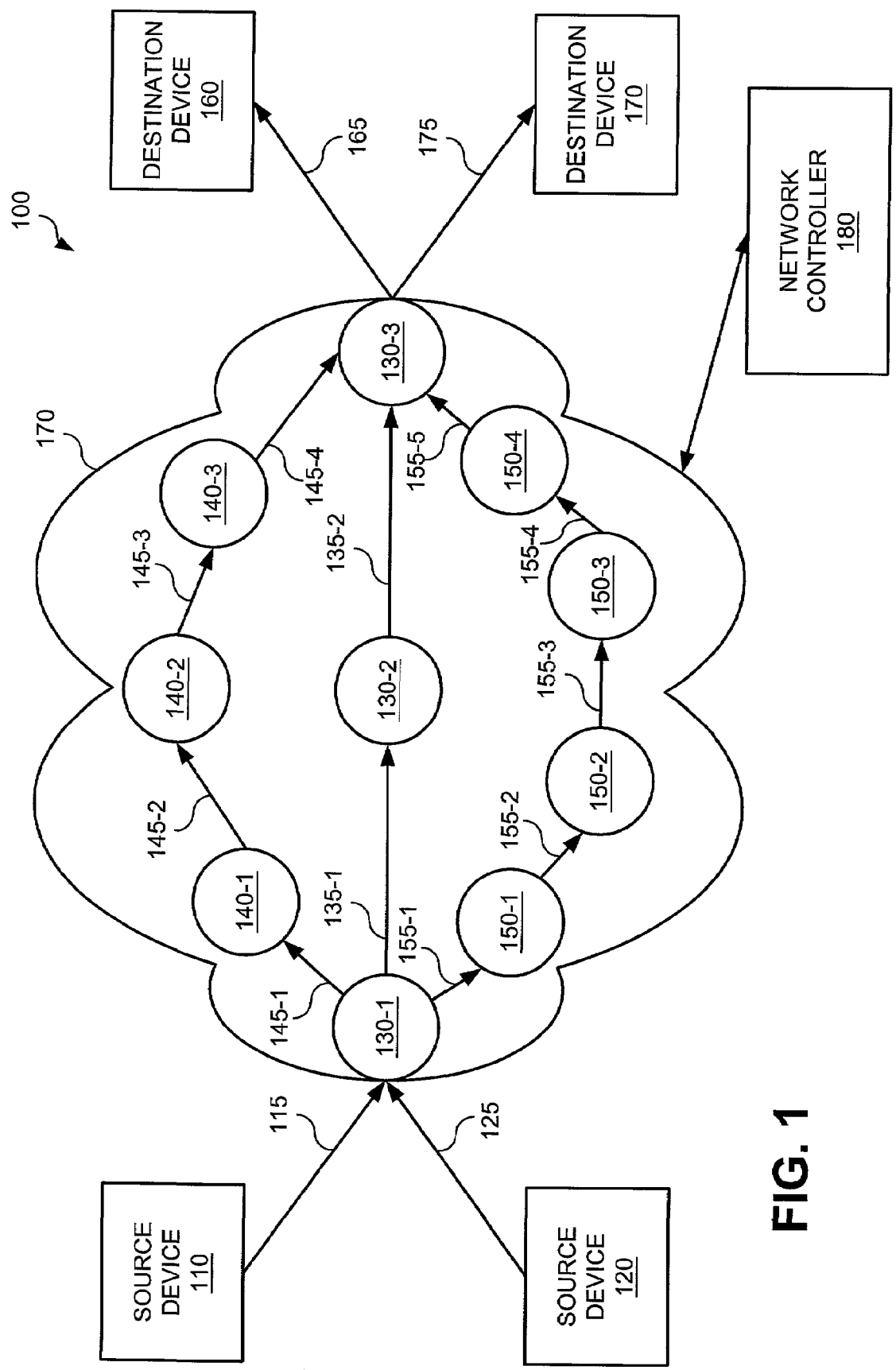
FIG. 1 illustrates a block diagram of a system that used to explain network routing and recovery.

Before proceeding with additional detail about the aspects of the present invention, it is helpful at this point to describe an exemplary system and possible routing problems in the system. Both packet and label switching networks have to route packets from a source to a destination. FIG. 1 helps to illustrate routing determination and possible problems. A system 100 is shown in FIG. 1. System 100 comprises two source devices 110, 120, two destination devices 160, 170, a network 170, and a network controller 180. Network 170 comprises a number of nodes 130-1, 130-2, 130-3, 140-1, 140-2, 140-3, 150-1, 150-2, 150-3, and 150-4. In this example, packets originate at source device 110, travel through link 115, are placed onto the network 170 by node 130-1, are removed from the network 170 by node 130-3, travel through link 165, and are received by destination device 160. Similarly, packets originate at source device 120, travel through link 125, are placed onto the network 170 by node 130-1, are removed from the network 170 by node 130-3, travel through link 175, and are received by destination device 170. For simplicity, paths taken by packets will be treated as one-way paths.

In system 100, there are three possible paths from which node 130-1 may select: (1) a path connecting nodes 140-1, 140-2, and 140-3 (collectively, "nodes 140"), having links 145-1, 145-2, 145-3, and 145-4 (collectively, "links 145"); (2) a path connecting nodes 130-1, 130-2, and 130-3 (collectively, "nodes 130"), having links 135-1 and 135-2 (collectively, "links 135"); and (3) a path connecting nodes 150-1, 150-2, 150-3, and 150-4 (collectively, "nodes 150"), having links 155-1, 155-2, 155-3, 155-4, and 155-5 (collectively, "links 155"). Each link has a certain capacity. Each node is generally a router or a device that performs the functions of a router.

Routing over a packet switching network 170 is normally relatively simple. When node 130-1 receives packets from link 115 or link 125, the node 130-1 determines how to route the packets based on the destinations, which are contained in the packets, and routing criteria, as discussed above. However, the routing criterion is usually solely shortest path, and most routers are oblivious to other criteria such as lowest cost and congestion. In the example of FIG. 1, it is assumed that the shortest path is through link 135-1, and packets from both source devices 110 and 120 are routed through this path. The node 130-2 will make a similar routing determination, again choosing the shortest path, which is through link 135-2. Consequently, routing tends to be a relatively simple affair, although more complex routing routines may be used, as discussed below.

Another important routing problem is providing backup paths in case a path though which data is currently being routed becomes unusable. For instance, packets from both source devices 110 and 120 might be routed through the path containing links 135. This path is called the primary path, and this path must, in this example, have enough capacity to support both source devices 110 and 120. For example, if source device 110 needs a capacity of 5 units and source device 120 needs a capacity of 7 units, then the path through links 135 must support at least a capacity of 12 units. The backup paths in this example are the paths through links 145 and links 155. These backup paths are called secondary paths, and capacity on these paths is reserved in case a failure occurs on the links 135 or nodes 130. In many systems, the capacity reserved on the secondary paths is at least the capacity on the primary paths. Therefore, in this example, 12 units of capacity must be reserved on the reserve paths having links 145 and 155. Assume that the reserved capacity on the path having links 145 is 5 units and the reserved capacity on the path having links 155 is 7 units. In this situation, the system 100 can respond to a failure of link 135 or node 130-2 by rerouting the packets from source device 110 through the path having links 145 and by rerouting the packets from source device 120 through the path having links 155. A system 100 or network 170 that provides reserve capacity for data is said to support recovery, and a system 100 or network 170 that reserves secondary capacity equivalent to the primary capacity is said to support 1-to-1 or 1 +1 protection.

The latter type of protection is fairly simple to implement in a network 170 using light pathways as the transmission medium. For instance, node 130-1 can simply sense if there is light on the link 135-1 and route the light pathways from link 135-1 to link 145-1 (for source device 110) and link 155-1 (for source device 120) if there is no light on link 135-1. While this type of protection is relatively simple, it takes forethought to configure the network 170 to automatically transfer capacity during failure. Additionally, the network 170 is usually limited to the predetermined primary and secondary pathways, and other secondary pathways, for instance, cannot be chosen without manual intervention. Finally, 1+1 protection reserves too much capacity and will cause a network to have to add capacity sooner than what would be necessary if less capacity is reserved.

One way for less capacity to be reserved is to allow secondary paths to be shared. For instance, assume the links 135 only support 5 units of capacity, while links 155 only support 7 units of capacity. Source device 110, which needs 5 units of capacity, is routed by node 130-1 through link 135-1, and source device 120, which needs 7 units of capacity, is routed by node 130-1 through link 155-1. If it is assumed that only one failure of a path will occur at a time, such that either the path having links 135 or the path having links 155 will fail but not both, then the reserved capacity can be 7 units of capacity. This allows the reserved path having links 145 to have 7 units of capacity reserved on the path, instead of the 12 units needed if both the path having links 135 and the path having links 155 fail at the same time. This recovery system is a shared recovery system.

A problem with shared recovery systems is that the analysis of a network can be quite complex. There are mathematical solutions that will determine an optimum routing for both primary and secondary paths for a number of sources and destinations. However, these mathematical solutions tend to take quite a while to solve and they tend to fail when the number of nodes, sources, and destinations exceeds a certain amount.

Moreover, as discussed above, many networks remain relatively fixed in their ability to have nodes switch paths. Nonetheless, new routers are becoming more prevalent, and the new routers support certain protocols that allow a remote device, such as network controller 180, to more easily configure routers to automatically switch to secondary paths when primary paths fail. Two important protocols that may be used to perform configuration functions are Multi-Protocol Label Switching (MPLS) and Multi-Protocol Wavelength Switching (MPλS). The latter is basically a specialized version of the former.

A network that supports MPLS is one type of label switching network. A label switching network runs in conjunction with a packet switching network, and uses labels placed into packets in order to route packets. The exact technique used to place the label into a packet depends on the underlying packet switching protocol being used. For example, the location for a label placed into a packet for a network using the Internet Protocol (IP) may be somewhat different than the location for a label for a packet for a network using Asynchronous Transfer Mode (ATM).

Regardless of the actual technique used to support labels in packets, normal routing procedures for packet switching are disabled in a label switching network. A "tunnel" is created to connect a source with a destination. The appropriate labels are selected for packets emanating from the source and entering the network so that the packets follow the tunnel and exit the network at the destination.

Even with these new protocols, the problem of determining how to efficiently and quickly route all of the requested capacity in a network while still providing shared recovery for large networks is still quite important. A need therefore exists for techniques that solve this problem.

Aspects of the present invention solve this problem by providing techniques that quickly converge to a network routing solution that is within a predetermined error from an optimal network routing solution.

The present invention is generally applicable to any technology or protocol that is path-oriented (as opposed to being link oriented) and that can perform explicit recovery, which means that the technology can transfer flow from one path to another. For example, Multi-Protocol Label Switching (MPLS) and Asynchronous Transfer Mode (ATM) are suitable technologies for implementing aspects of the present invention. The present invention is less applicable to Internet Protocol (IP), because IP is link (and not path) based. It should be noted, however, that MPLS and Multi-Protocol Wavelength Switching (MPλS) can be implemented over IP.

It should also be noted that the techniques of the present invention are scalable. Many techniques for determining network routing fail when the number of nodes passes a certain value. It can be shown that the present invention can be used with a very large number of nodes.

Broadly, the setting of shared protection is as follows. A network G=(V,E) is considered with a capacity u(e) and cost c(e) for each link e. The network G is modeled as an undirected graph. In graph theory terms, G is usually called a graph and a link e is called an edge. There is also a set, K, of commodities (or "demand-pairs"), each commodity k∈K specified by a source-sink pair $(s_k, t_k)$, demand $d_k$, and a collection $\Lambda_k$ of pairwise link-disjoint paths, each of which connects $s_k$ to $t_k$. That is, no two paths in $\Lambda_k$ have any common link. Any single link of G may fail at any time, thus rendering all paths that pass through it temporarily useless, until the link is made live again. All flows, however, for commodity k must be routed on one of the paths in $\Lambda_k$.

One objective of the present invention is to design working and restoration capacity so that under certain failure states, there is still enough capacity to meet demand. Moreover, the long term operational cost of these traffic flows is to be minimized. To do this, statistical information on the relative likelihoods of the various links is assumed, and as a result, paths in $\Lambda := \cup_{k \in K} \Lambda_k$ failing (a path fails when one of its links fails). This information is updated as further failures occur, with old information discounted in order to have an accurate picture of the existing network. For each commodity k specified by its source-sink pair, $(s_k, t_k)$, what must be chosen is (a) appropriate primary flows on paths in $\Lambda_k$, and (b) how much flow is transferred from one path to another in the event of a failure. This important requirement that there be sufficient flow even under any link failure is formalized below. Furthermore, under the normal state of no failure, as well as under the failure of any single link, the capacity of any link, e, should not be exceeded: the total demand using it should be at most u(e). An objective is to design the paths, flows, and flow transfer strategies under failure, in order to minimize the long term average cost of operating the network. This average cost is just the expected long term cost of operating the network under a given collection of primary and backup paths, where the random variables are the failures of the various paths.

Figure 2:
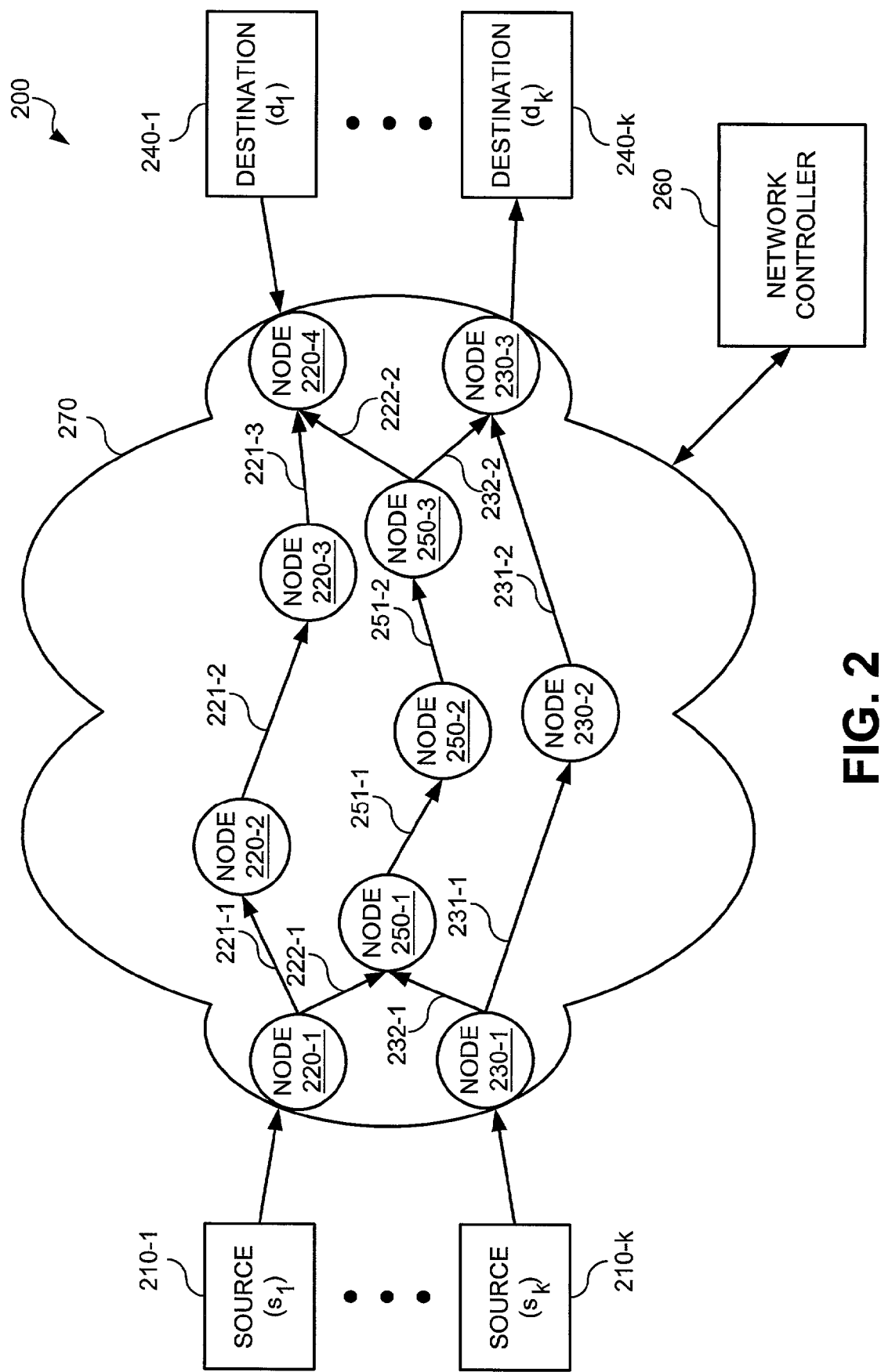
FIG. 2 illustrates a block diagram of an exemplary system used to illustrate aspects of the present invention.

Referring now to FIG. 2, an exemplary system 200 is shown. System 200 comprises k sources 210-1 through 210-k (collectively, "sources 210"), k destinations 240-1 through 240-k (collectively, "destinations 210"), network 270, and a network controller 260. Network 270 comprises a plurality of nodes, of which nodes 220-1 through 220-4 (collectively, "nodes 220"), nodes 230-1 through 230-3 (collectively, "nodes 230"), and nodes 250-1 through 250-3 (collectively, "nodes 250") are shown. Although only nodes 220, 230, 250 are shown, generally a network 270 using techniques of the present invention will contain many such nodes. The nodes that are shown are merely exemplary. The nodes are interconnected through links (also called edges). For instance, node 220-1 is connected to node 220-2 through link 221-1. Each of the links 221-1 through 221-3 (collectively, "links 221"), link 232-1, link 232-2, links 251-1 and 251-2 (collectively, "links 251"), links 231l and 231-2 (collectively, "links 231") have a capacity u(e) and cost c(e).

Each commodity k, which is specified by a source-sink pair $(s_k,t_k)$ such as source-sink pair (210-1, 240-1), has a demand $d_k$. In the example of FIG. 2, the source-sink pair (210-1, 240-1) is routed over a path comprising nodes 220 and links 221. The source-sink pair (210-1, 240-1) has demand $d_1$. Similarly, source-sink pair (210-k, 240-k) is routed over a path comprising nodes 230 and links 231. Capacity is reserved on links 222-1, 250, and 222-2 in order to route the demand $d_1$ if one of the links 221 fails (or, equivalently, if a node 220-2 or 220-3 fails). Similarly, capacity is reserved on links 232-1, 250, and 232-2 in order to route the demand $d_k$ if one of the links 231 fails (or, equivalently, if a node 220-2 or 220-3 fails). This example is a shared recovery network, although the techniques of the present invention may also be used to determine network routing for dedicated reserve capacity, as discussed below.

In order to route the demand, network controller 260 uses a number of methods to determine how much demand should be routed on each link (called the primary capacity) and how much capacity should be reserved on each link in case a link on which demand is being routed fails (called secondary or reserve capacity). The network controller 260 then acts to configure nodes 220, 230, and 250 of the network 270 in order to bring about the determined primary and secondary capacities.

In a preferred embodiment, all or a portion of network 270 employs label switching. This label switching is generally controlled though Multi-Protocol Label Switching (MPLS), which can include Multi-Protocol Wavelength Switching (MP$\lambda$S), and its control protocols. A good introduction to MPLS and MP$\lambda$S is given in Jarram and Farrel, "MPLS in Optical Networks: An Analysis of the Features of MPLS and Generalized MPLS and Their Application to Optical Networks, with Reference to the Link Management Protocol and Optical UNI," white paper from Data Connection, 100 Church St., Enfield, UK, (October, 2001), the disclosure of which is hereby incorporated by reference.

As discussed briefly above, MPLS is a new and promising routing scheme that aims to provide end-to-end quality of service (QoS) in otherwise best-effort packet networks. The attraction of MPLS is due to its combined high performance and efficient layer-2 switching with the intelligence of layer-3 Internet protocol (IP) control. By creating and pinning down tunnels, or Label-Switched (explicit) Paths (LSPs) with well-defined bandwidths, MPLS makes it possible to carry QoS-sensitive applications such as real-time audio and video in an IP network. See Rosen et al., "Multiprotocol Label Switching Architecture, Internet Engineering Task Force Request for Comments 3031 (IETF RFC 3031) (January 2001), the disclosure of which is hereby incorporated by reference. By identifying a wavelength with a label, this protocol has been extended to provide a complete IP-based mechanism to set up, manage, reconfigure and tear down wavelength tunnels in the optical core of networks. MP$\lambda$S, as this protocol is known, makes it possible to add intelligence and reconfigurability to the traditionally static optical core of networks. See Ashwood-Smith et al., "Generalized MPLS—Signaling Functional Description," IETF draft (November 2001) and IEEE Communications Magazine (December 1999), the disclosures of which are hereby incorporated by reference. Intelligent routing and reconfigurability are the key requirements of the emergent optical Internet.

To provide these desired capabilities in an optical network, traffic loads between distinct source-destination pairs are measured and abstracted, and the emerging set of demands aggregated, groomed and source-destination loads with bit-rates at or close to a wavelength are created. These are the set of loads that need to be provisioned over an existing network, with both primary and backup wavelength-switched paths (also known as $\lambda$-Switched Paths or $\lambda$SP tunnels) for protection. Since only a small number of backup tunnels are typically invoked at a time, there is considerable room for their capacity sharing. For instance, if a network is to protect against single-link failures and if primary tunnels $P_1$ and $P_2$ do not share any links, then their respective backup paths can share $\lambda$s (since $P_1$ and $P_2$ should not fail simultaneously). Efficient management of backup paths such as MP$\lambda$S tunnels in a network, can result in up to fifty percent increase in the throughput of a network. For the latter, see Davis et al., "SPIDER: A Simple and Flexible Tool for Design and Provisioning of Protected Light-Paths in Optical Networks," Bell Labs Technical Journal, Vol. 6, No. 1 (January 2001), the disclosure of which is hereby incorporated by reference.

Figure 3:
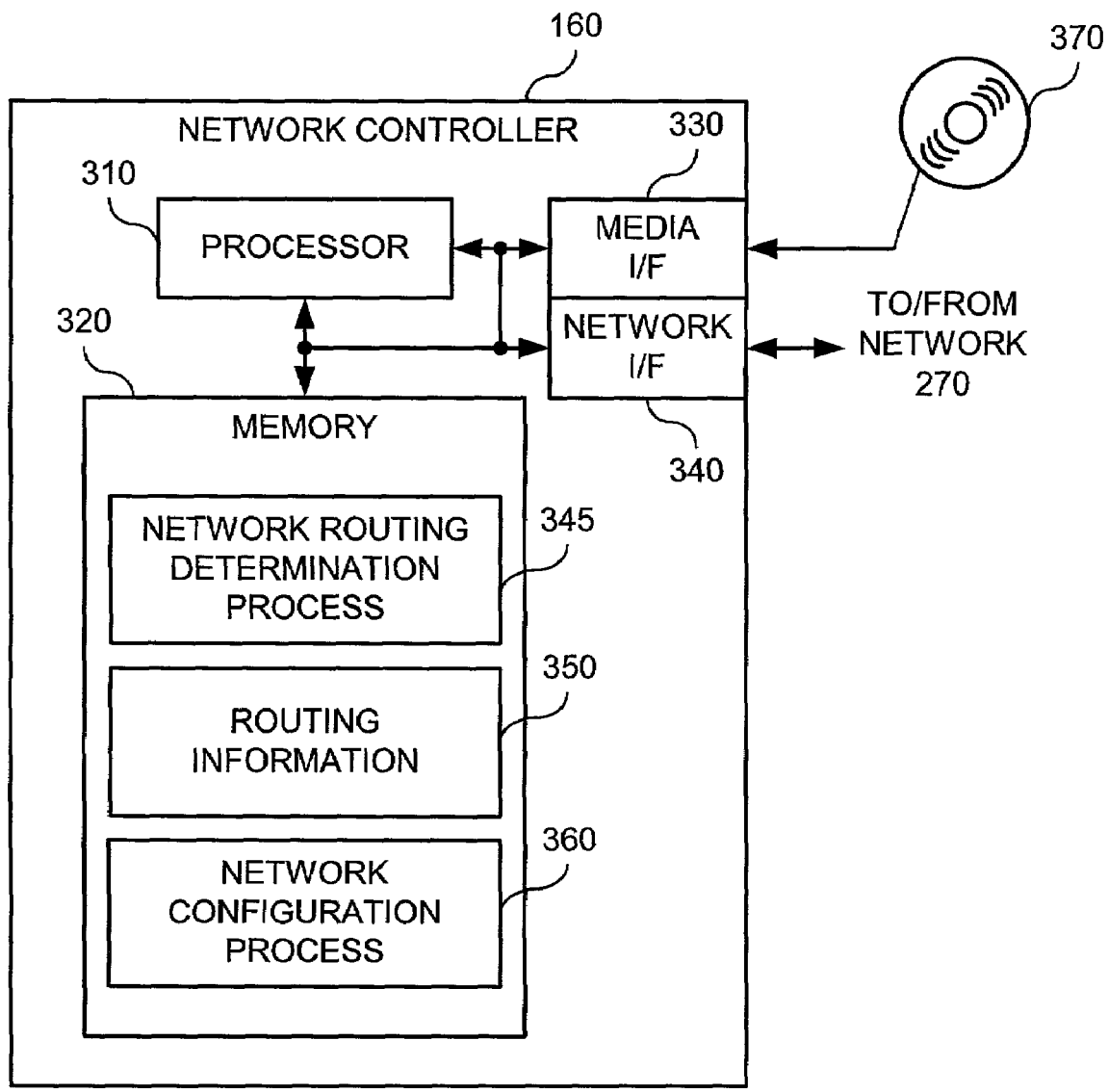
FIG. 3 is a block diagram of an exemplary network controller in accordance with a preferred embodiment of the invention.

Referring now to FIG. 3, an exemplary network controller 160 is shown interacting with network 270 and Digital Versatile Disk (DVD) 370. Network controller 160 comprises a processor 310, a memory 320, a media interface 330, and a network interface 340. Memory 320 comprises a network routing determination process 345, routing information 350, and a network configuration process 360. Network interface 340 communicates with network 270 and with processor 310 and memory 320. Note that many networks will contain other layers of software and hardware that are not shown but are known to those skilled in the art. For example, the Internet Protocol (IP) contains multiple layers, some of which are used to access hardware and others are strictly software. Media interface 330 is used to allow processor 310 to access DVD 370 or other types of media, such as hard drives or removable drives or optical storage means.

Network routing determination process 345 uses demands for commodities and determines appropriate routing for links. Network routing determination process 345 uses an $\epsilon$-approximation technique, which means that the optimal network routing is not determined. Instead, an approximation to the optimal network routing is used, and this approximation is within $\epsilon$ away from the actual network routing. By making $\epsilon$ very small, the techniques of the present invention may be used to come arbitrarily close to the actual network routing such that, in real-world terms, the $\epsilon$-based and actual network routings are indistinguishable. However, with decreases in $\epsilon$, there are corresponding increases in processing time. Technologies such as the Internet and IP can experience rapid changes in demand, and it is beneficial to use higher values of $\epsilon$ in order for the methods of the present invention to quickly converge to a solution. In addition, one may compute, ahead of time, an upper bound on the number of iterations require to obtain the desired accuracy. This gives an estimate of how long to expect the algorithm to run. Moreover, current Internet routing techniques are poor in this regard, and are often 30-40 percent away from the optimum network routing for a particular set of commodities and demands.

The routing information determined from network routing determination process 345 is stored in routing information 350, and this information will usually comprise a list of links, how much demand should be routed over each link, and how much demand should be reserved on each link. The reserved capacity on each link can be shared capacity, dedicated capacity, or a combination of both of these. Routing information 350 may also contain additional data, such as cost for each link.

Network configuration process 360 uses the routing information 350 to configure network 270 to support the primary and secondary flows of the routing information 350. As is known in the art, routers generally contain routing tables that are used to route incoming packets to outgoing ports. These tables can be modified to set up the network 270 in accordance with the routing information 350. Similar tables are used for MPLS and MP$\lambda$S, and these tables may be changed through certain control protocols. See, for instance, the Link Management Protocol section of Jerram, which has been incorporated by reference above. Additionally, the routing information 350 may be simply output to a screen or file in a manner suitable for a network administrator to view and determine network routing.

Figure 4:
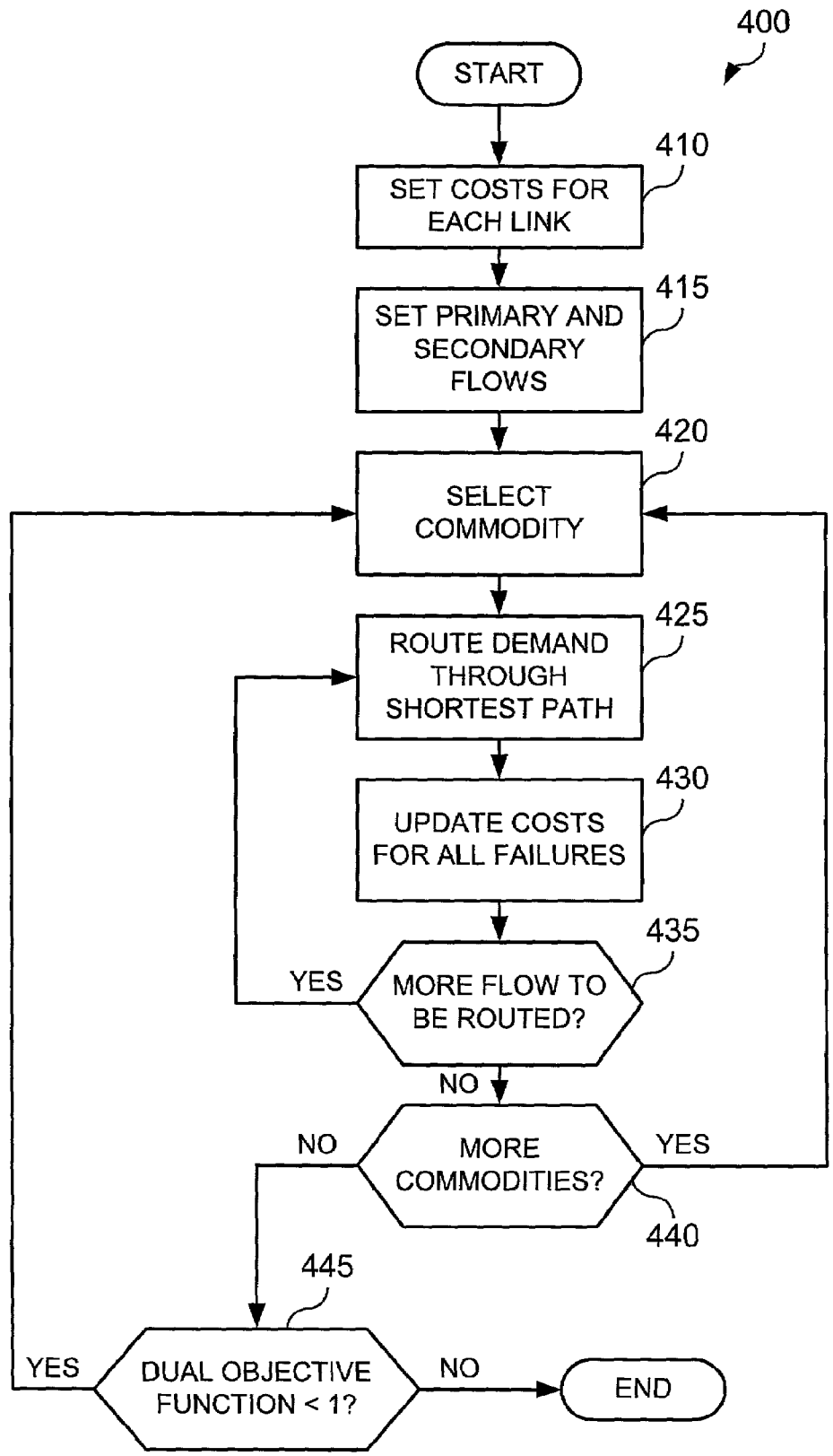
FIG. 4 is a flow chart of a method of determining network routing without a budget constraint, in accordance with a preferred embodiment of the invention.

As described in detail below, network routing determination process 345 can contain budgeting criteria or have no budgeting criteria. Network routing determination process 345 can employ shared recovery, where no reserve capacity is dedicated, or employ dedicated reserve capacity for each commodity. In FIG. 4, a method is disclosed for determining network routing without a budget constraint, and, in FIG. 5, a method is disclosed for determining network routing with a budget constraint. Other methods are discussed below.

As is known in the art, the methods and apparatus discussed herein may be distributed as an article of manufacture that itself comprises a computer system-readable medium having computer system-readable code means embodied thereon. The computer system-readable code means is operable, in conjunction with a device such as network controller 160, to carry out all or some of the steps to perform the methods or create the apparatuses discussed herein. The computer system-readable medium may be a recordable medium (e.g., floppy disks, hard drives, memory cards, or optical disks, such as DVD 370, which is accessed through medium interface 330) or may be a transmission medium (e.g., a network comprising fiber-optics, the worldwide web, cables, or a wireless channel using time-division multiple access, code-division multiple access, or other radio-frequency channel). Any medium known or developed that can store information suitable for use with a computer system may be used. The computer system-readable code means is any mechanism for allowing a computer system to read instructions and data, such as magnetic variations on a magnetic medium or height variations on the surface of a compact disk, such as DVD 370.

Memory 320 configure its processor 310 to implement the methods, steps, and functions disclosed herein. Memory 320 memories could be distributed or local and the processor 310 could be distributed or singular. Each memory could be implemented as an electrical, magnetic or optical memory, or any combination of these or other types of storage devices. Moreover, the term "memory" should be construed broadly enough to encompass any information able to be read from or written to an address in the addressable space accessed by a processor 310. With this definition, information on a network (e.g., wired network 270 or a wireless network) is still within a memory, such as memory 320, because the processor, such as processor 310, can retrieve the information from the network. It should be noted that each distributed processor that makes up a distributed processor generally contains its own addressable memory space. It should also be noted that some or all of network controller 160 can be incorporated into an application-specific or general-use integrated circuit. For example, the network routing determination process 345 may be made into an application-specific integrated circuit.

The problem of determining flow in a graph, such as system 200 of FIG. 2, is now modeled more formally. A graph, $G=(V,E)$, is considered with edge capacities $u(e)$, costs $c(e)$; a set of commodities K, each commodity k specified by a source-sink pair $(s_k, t_k)$ with demand $d_k$; and a set of network states Q. Each state corresponds to a potential set of network element failures. It is assumed that there is a state, $q_0 \in Q$, that is the normal state when no failures have occurred. With each commodity, k, is a corresponding set of disjoint paths $\Lambda_k$ from $s_k$ to $t_k$. By "disjoint," it is meant that no two paths in $\Lambda_k$ have any common link. What is sought is enough reserved capacity to route all demands $d_k$ on paths in $\Lambda_k$, while respecting edge capacities so that, if some network failure occurs affecting a subset of paths in $\Lambda := \cup_{k \in K} \Lambda_k$, there is enough reserve capacity to reroute any disrupted flow. The cost of a solution is the sum over all links $e \in E$ of their costs, $c(e)$, times the expected amount of flow on that edge e (over time).

First, the best fractional solution possible is determined. To do this, the problem is formatted as a linear program. Variable $x(P)$ denotes the amount of flow on path P. Variable $y^{P'}(P)$ denotes the amount of flow that is rerouted from path P' to path P when a link on path P' fails. Variable $y^{P'}(P)$ is defined if and only if the following are true: (a) $P \neq P'$ and (b) P and P' are paths for the same commodity. When failure q occurs, the set of affected paths is denoted by $\Lambda(q)$ (so $\Lambda(q_0) = \emptyset$). Let $Q_k \subseteq Q$ denote the set of all failures that affect some path in $\Lambda_k$. The formulation used herein assumes that $|\Lambda_k \cap \Lambda(q)| \leq 1$ for all k, q. That is, it is assumed that a failure does not affect more than one path in $\Lambda_k$.

For each path $P \in \Lambda$, let $\kappa(P)$ denote the steady-state proportion of time for which P is in non-failed mode. As mentioned above, these probabilities $\kappa(P)$ are continuously updated and learned. To model the objective function, assign, for each commodity k and paths $P_1, P_2 \in \Lambda_k$, a cost $c(P_1, P_2)$ as follows: $c(P,P) = \kappa(P) \Sigma_{e \in P} c(e)$, and if $P_1 \neq P_2$, $c(P_1, P_2) = (1-\kappa(P_1)) \Sigma_{e \in P_2} c(e)$. Thus, $c(P,P)$ is the (long term) expected cost of primary flow on path P, and $c(P_1, P_2)$, for $P_1 \neq P_2$, is the (long term) expected cost of backup flow on $P_2$ from $P_1$. Henceforth, set $c(P) := c(P,P)$. So, by the linearity of expectation, the objective function of long term average cost is:

$$EC(x, y) = \sum_{k} \sum_{P \in \Lambda_k} \left[ c(P)x(P) + \sum_{P_1 \in \Lambda_k \backslash P} c(P_1, P) y^{P_1}(P) \right]. \quad (1)$$

The problem, called Minimize Operational Cost (MOC), may now be formulated as the following Linear Program (LP):

min $EC(x,y)$ subject to the following:

$$\sum_{P \in \Lambda_k} x(P) \geq d_k \quad \forall\, k \in K$$

$$\sum_{P \in \Lambda_k \backslash P'} \left[ x(P) + y^{P'}(P) \right] \geq d_k \quad \forall\, P' \in \Lambda_k, \forall\, k \in K$$

$$\sum_{k \in K} \sum_{\substack{P: e \in P \\ P \in \Lambda_k \backslash \Lambda(q)}} \left[ x(P) + \sum_{P' \in \Lambda_k \cap \Lambda(q)} y^{P'}(P) \right] \leq u(e) \quad \forall\, e \in E, \forall\, q \in Q$$

$$x, y \geq 0$$

The first constraint above says that under no-failure conditions, the total demand $d_k$ should be met for each commodity k. The second constraint says that this demand-satisfaction should hold even if any path $P'\epsilon\Lambda_k$ fails. The third constraint is that under any network state q (including the no-failure state $q_0$), the total flow on any link e should be at most its capacity. The final trivial constraints are also shown, which force all variables to be non-negative.

This linear program (MOC) will be very large for moderate sized networks and a moderate number of failure scenarios. This linear program may be used to model how to route traffic in the Internet. Since the Internet changes frequently, this problem needs to be solved quickly. Exact linear programming codes, which will determine an exact solution to the problem, are too slow. Since the networks normally dealt with typically have reserve capacity, approximate solutions are suitable. Aspects of the present invention adapt approximate LP techniques to obtain a provably good solution to this linear program. For multicommodity flow problems, e-approximation methods have proven to be computationally effective in practice. Thus, these methods can be adapted to solve this problem.

1. Maximum Concurrent Recovery Problem

To start, it is determined if there is a feasible solution. Thus, the cost objective function is exchanged with the objective to maximize the minimum fraction of each demand that is met. This involves modifying the demand constraints as well. A new variable $\lambda$ is introduced that represents the minimum fraction of demand routed, over all commodities, and the variables $f(e)$ are replaced with the given capacities $u(e)$.

Since it is assumed that $|\Lambda_k \cap \Lambda(q)| \leq 1$ for all k, q, the second set of inequalities in (MAC) can be simplified so that there is precisely one inequality for every $P'\epsilon\Lambda$. For clarity, this will be written as $\forall P'\epsilon\Lambda_k$, $\forall k\epsilon K$. The summation in the third set of inequalities in (MAC) is also broken down by commodities. This linear program is then as follows (note that the maximization of $\lambda$ formulation is copied from the (MOC) above).

max$\lambda$ subject to the following:

$$\sum_{P \in P_k} x(P) \geq \lambda d_k \, \forall k \in K$$

$$\sum_{P \in \Lambda_k \setminus P''} [x(P) + y^{P'}(P)] \geq \lambda d_k \, \forall P' \in \Lambda_k, \forall k \in K$$

$$\sum_{k \in K} \sum_{\substack{P:e\in P \\ P \in \Lambda_k \setminus \Lambda(q)}} \left[ x(P) + \sum_{P' \in \Lambda_k \cap \Lambda(q)} y^{P'}(P) \right] \leq u(e) \, \forall e \in E,$$

$\forall q \in Q$ $x, y, \lambda \geq 0.$

The dual of this linear program is $$\min \sum_{e \in E} u(e) \sum_{q \in Q} h^q(e)$$

$$\sum_{q:P' \in \Lambda(q)} \sum_{e \in P} h^q(e) \geq w^{P'}, \forall k \in K, \forall P' \in \Lambda_k, P \in \Lambda_k - \{P'\}$$

-continued $$\sum_{q:P \notin \Lambda(q)} \sum_{e \in P} h^q(e) \geq z_k + \sum_{P' \in \Lambda_k - \{P\}} w^{P'}, \forall P \in \Lambda_k, \forall k \in K$$

$$\sum_{k \in K} d_k z_k + \sum_{k \in K} \sum_{P' \in \Lambda_k} d_k w^{P'} \geq 1$$

$h, w, z \geq 0.$

It is beneficial to define new dual variables, $Z_k = z_k + \Sigma_{P' \in P_k} w^{P'}$. Intuitively, the dual variable $h^q(e)$ represents the marginal cost of link e when the network is in state q. Following this intuition, $w^{P'}$ is the cost of the cheapest recovery path that could be taken if path P' were to fail. This means $Z_k$ is the cost of the cheapest backup path for commodity k, including in this the cost of the appropriate backup path in case of failure. The dual linear program may then be rewritten as follows:

$$\min \sum_{e \in E} u(e) \sum_{q \in Q} h^q(e)$$

$$\sum_{q:P' \in \Lambda(q)} \sum_{e \in P} h^q(e) \geq w^{P'} \, \forall k \in K, \forall P' \neq P', P' \in \Lambda_k, P \in \Lambda_k$$

$$w^P + \sum_{q:P \notin \Lambda(q)} \sum_{e \in P} h^q(e) \geq z_k \, \forall P \in \Lambda_k, \forall k \in K$$

$$\sum_{k \in K} d_k Z_k \geq 1$$

$x, y, \lambda \geq 0$ 1.1 An Exemplary Method for Determining an Approximate Solution A preferred method for determining an approximate solution to network routing will be discussed in the following manner. First, the method will be described in succinct terms and through a figure. Next, a more elaborate pseudocode version of the method will be presented. Finally, analyses and proofs will be presented.

Referring now to FIG. 4, a method 400 is shown for determining an approximate solution to network routing. Method 400 is performed by a network controller, although other computer systems may also perform the method. First, the method 400 starts with setting a dual solution $h^q(e)=\delta/u(e)$ (step 410), for an appropriately small $\delta$, which will be given later as a function of $\epsilon$, m, and $|Q|$, and a primal solution $x=y=0$ (step 415). Given any vector h, one can obtain w by setting $w^{P'}$ equal to the minimum over all possible backup paths P for P' of $\Sigma_{q:P \in \Lambda(q)} \Sigma_{e \in P} h^q(e)$. Define $h^q(e)$ as $h^q(P):=\Sigma_{e \in P} h^q(e)$. Then define $Z_k$ as follows.

$$Z_k \equiv \min_{P_1 \in \Lambda_k} \left[ \sum_{q:P_1 \notin \Lambda(q)} h^q(P_1) + \min_{P_2 \in \Lambda_k \setminus P_1} \sum_{q:P_1 \in \Lambda(q)} h^q(P_2) \right] \quad (2)$$

$$= \min_{P_1, P_2 \in \Lambda_k: P_1 \neq P_2} \left[ \sum_{q:P_1 \notin \Lambda(q)} h^q(P_1) + \sum_{q:P_1 \in \Lambda(q)} h^q(P_2) \right]$$

Note that what has been ensured is that all the dual equations, but that for $\lambda$, are satisfied. To satisfy the $\lambda$ equation, simply divide all dual variables by $\alpha + \Sigma_{k \in K} Z_k d_k$ to obtain a feasible solution that satisfies $\Sigma_k d_k Z_k = 1$.

This exemplary method cycles through the commodities. For each visit to commodity k (step 420), the method will push $d_k$ flow along paths in $\Lambda_k$. This pushing is preferably performed on a "cheapest" pair of paths $P_1,P_2$, which is a pair for which the primary flow on $P_1$ plus the restoration flow on $P_2$ is minimized (step 425). The method then pushes along $P_1$ an amount u determined as the minimum of three quantities. Let u(P) denote the bottleneck capacity of P:u (P):=$\min_{e \in P}$u(e). Then u is set equal $\min\{u(P_1),u(P_2),d_k\}$. The method continues by pushing u along path $P_2$ and updates the primal and dual variables x,y,h as described in the pseudocode below. In particular, costs are updated (step 430) for each failure mode. The method 400 repeats this process until $d_k$ units of flow have been pushed along primary paths, then proceeds to the next commodity (step 440=YES). In other words, if the amount being pushed through a primary path is less than the demand needed by the commodity (step 435=YES), then demand is again routed (step 420) and costs are updated (step 430). Otherwise (step 435=NO), another commodity is selected (step 440). In practice, it is beneficial to start the method by scaling all capacities so that $\max_k d_k \leq \min_e u(e)$. Thus, u is in effect always equal to $d_k$, and the method sends flow exactly once per commodity per iteration.

The method stops when an $\epsilon$-approximate solution is found. An $\epsilon$-approximate dual solution is be used to verify the $\epsilon$-approximate primal solution. It will be shown below that a sufficient criterion for this is when the value of the dual objective function is at least 1. The dual objective function for this example is defined above as $$\sum_{e \in E} u(e) \sum_{q \in Q} h^q(e),$$

which is being minimized in the linear program.

The method ends when the value of the dual objective function is at least one (step 445=NO), else another commodity is selected (step 445=YES). Given $h^q$ for each q, define D(h) as the value of the corresponding dual objective function. For an integer i, define D(i) to be the dual objective function value at the beginning of the $i^{th}$ iteration; whenever the term "iteration" is used below, the outer "while" loop in the method is being described. Method 400 in pseudocode appears below.

```
Initialize h^q(e) = δ/u(e) ∀e ∈ E, ∀q ∈ Q
Initialize x = 0, y = 0
while D(h) < 1
    for k = 1 to |K| do
        d' ← d_k
        while D(h) < 1 and d' > 0
            P_1, P_2 ← shortest disjoint path pair in Λ_k that
                minimizes Eq. (2)
            u ← min{d', u(P_1), u(P_2)}
            x(P_1) ← x(P_1) + u
            y^{P_1}(P_2) ← y^{P_1}(P_2) + u
            d' ← d' - u
            for q ∈ Q
                if P_1 ∈Λ(q) do
                    ∀ e ∈ P_1, h^q(e) ← h^q(e)e^{εu/u(e)}.
                else do
                    ∀ e ∈ P_2, h^q(e) ← h^q(e)e^{εu/u(e)}.
```

-continued

```
            end for
        end while
    end for
end while
```

The procedure stops at the first iteration t for which D(t+1) $\geq 1$. In the first t-1 iterations, for every commodity k, there has been routed $(t-1)d_k$ units of flow along primary paths and backup paths. This flow may violate capacity constraints. By scaling appropriately, the flow can be made feasible.

A lemma and a theorem are now discussed.

$$\lambda > \frac{t-1}{\log_{e^\epsilon}\left(\frac{1}{\delta}\right)}.$$

Proof: Consider link e. Consider the third primal inequality for some fixed (q,e). Whenever x(P) is increased for some (k,P) pair such that $P \in \Lambda_k \backslash \Lambda(q)$ by some value u, the first "for" loop inside the inner while loop multiplies $h^q(e)$ by $e^{\epsilon u/u(e)}$. Whenever $y^{P'}(P)$ is increased for some (k,P,P'), such that $P \in \Lambda_k \backslash \Lambda(q)$ and $P' \in \Lambda(q) \cap \Lambda_k$ by some value u, the second "for" loop inside the inner while loop multiplies $h^q(e)$ by $e^{\epsilon u/u(e)}$. Thus, $h^q(e)$ increases by a factor of $e^\epsilon$ with every u(e) units that use link e in state q. Since $h^q(e)=\delta/u(e)$ initially and is less than 1/u(e) at the end of iteration t-1, the flow through e is at most $u(e) \cdot \log_{e^\epsilon} 1/\delta$ at the end of iteration t-1. Thus, dividing the primal solution at the end of iteration t-1 by $\log_{e^\epsilon} 1/\delta$ gives a feasible solution. This ends the proof of Lemma 1.

It should be noted that other exponential functions, instead of $e^{\epsilon u/u(e)}$, may be used to modify $h^q(e)$. However, it is likely that the function used to modify $h^q(e)$ must be exponential in order for the method to provably converge to a solution.

Theorem 1.2: Suppose the optimal primal (and hence dual) solution value is at least 1. If this is not true, it is easily achievable by scaling the numerical values in the primal and dual problems, as pointed out in Garg et al., "Faster and Simpler Algorithms for Multicommodity Flow and Other Fractional Packing Problems," IEEE Symp. on Foundation of Comp. Sci., 300-309 (1998), the disclosure of which is incorporated herein by reference. The primal solution at the end of the (t-1)st iteration divided by $\log_{e^\epsilon} 1/\delta$ is an $\epsilon'$-approximate solution, for $\epsilon'=c\epsilon$, for an appropriate constant c>0, and appropriate choice of $\delta$.

Proof: Let $h_i$ be the length functions at the beginning of the $i^{th}$ iteration. Let $h_{i,k}$ be the length functions before routing the $k^{th}$ commodity in the $i^{th}$ iteration. Let $h_{i,k,s}$ be the length functions before routing the $s^{th}$ pair of paths for commodity k in the $i^{th}$ iteration.

Let $Z_k(h)$ be the value of $Z_k$ computed using the given values of h variables before the rescaling necessary to make the dual feasible. Equivalently, $Z_k(h)$ is the value of Eq. (2), where $P_1,P_2$ are the shortest disjoint-path pair which the method would select when presented with the length functions given. Let $\alpha(h)$ equal $\Sigma_{k \in K} d_k Z_k(h)$. The variable $\alpha$ is defined so that h divided by $\alpha(h)$ is a feasible dual solution with value $D(h)/\alpha(h)$.

After flow u has been routed on $P_1$ and $P_2$ as the $s^{th}$ pair of primary and backup paths for commodity k, the bound shown below occurs for $D(h_{i,k,s+1})$. The bound is presented below using the following notational conveniences:

$$S \equiv \{(e,q): e \in P_1, P_1 \in \Lambda(q)\} \quad (3)$$

$$S' \equiv \{(e,q): e \in P_2, P_2 \in \Lambda(q)\} \quad (4)$$

Using this notation, the bound is then the following:

$$D(h_{i,k,s+1}) = \sum_{e \in Q} u(e) \sum_{q \in Q} h_{i,k,s+1}^q(e) \quad (5)$$

$$= D(h_{i,k,s}) + \sum_{(e,q) \in S} u(e) h_{i,k,s}^q(e) \left( e^{\varepsilon \frac{u}{u(e)}} - 1 \right) +$$

$$\sum_{(e,q) \in S'} u(e) h_{i,k,s}^q(e) \left( e^{\varepsilon \frac{u}{u(e)}} - 1 \right) \le$$

$$D(h_{i,k,s}) + \sum_{(e,q) \in S} h_{i,k,s}^q(e) \left( u\varepsilon + \varepsilon^2 \frac{u^2}{u(e)} \right) +$$

$$\sum_{(e,q) \in S'} h_{i,k,s}^q(e) \left( u\varepsilon + \varepsilon^2 \frac{u^2}{u(e)} \right),$$

where inequality (5) uses the fact that $e^a \le 1+a+a^2$ for $0 \le a \le 1$. For notational convenience, let $$\gamma \equiv \sum_{e \in P_1} \sum_{q: P_1 \notin \Lambda(q)} h_{i,k,s}^q(e) + \sum_{e \in P_2} \sum_{q: P_1 \in \Lambda(q)} h_{i,k,s}^q(e)$$

$$\gamma \equiv \sum_{q: P_1 \notin \Lambda(q)} h_{i,k,s}^q(P_1) + \sum_{q: P_1 \in \Lambda(q)} h_{i,k,s}^q(P_2)$$

Thus, from Eq. (5), the following can be discerned:

$$D(h_{i,k,s+1}) \le D(h_{i,k,s}) + u\varepsilon(1+\varepsilon)\cdot\gamma \quad (6)$$

$$D(h_{i,k,s+1}) \le D(h_{i,k,s}) + u\varepsilon(1+\varepsilon)Z(h_{i,k,s}), \quad (7)$$

where inequality (6) uses the fact that u is upper-bounded by $\min\{u(P_1), u(P_2)\}$, and inequality (7) follows from the definition of $Z_k$ in Eq. (2).

Note that the length functions are non-decreasing. Then over all the path pairs chosen in the process of pushing $d_k$ flow for commodity k, one can conclude the following:

$$D(h_{i,k+1}) \le D(h_{i,k}) + \varepsilon(1+\varepsilon) d_k Z_k(h_{i,k+1})$$

Each iteration pushes $d_k$ for every commodity. Extending this inequality over all values of k and again noticing that the length functions (and thus $Z_k$) are nondecreasing, it is possible to conclude the following:

$$D(i+1) \le D(i) + \varepsilon(1+\varepsilon) \sum_{k \in K} d_k Z_k(h_{i+1}) \le D(i) + \varepsilon(1+\varepsilon) \alpha(h_{i+1}).$$

Thus, a crucial inequality has been established here that may be used as in the analysis presented in Garg (incorporated by reference above), Section 5. Let $\beta$ be the optimal dual (and thus primal) objective function value. Since the initial objective function value is at most $m(|Q|+1)\delta$, through a very similar analysis to that in Garg, one can conclude that if $\beta \ge 1$ and if the method terminates in iteration t then $$\frac{\beta}{t-1} \le \frac{\varepsilon(1+\varepsilon)}{(1-\varepsilon)\ln\frac{1-\varepsilon}{m|Q|\delta}}.$$

Thus, setting $\delta = (m|Q|+1)/(1-\epsilon))^{-1/\epsilon}$ implies (using the same arguments as in Garg) that this gives a provably good approximate solution. This ends the proof of Theorem 1.1.

Run time analysis: Let n denote the number of nodes in G (as mentioned above, m denotes the number of links in G. Also recall that $|Q|=m+1$. Each augmentation requires $O(m|Q||\Lambda|^2(\log n)^{O(1)})$ time to find a shortest path. Similar to the analysis in Garg, Section 7, the number of iterations before the stopping criterion is met is $O(\epsilon^2(|\Lambda|+m|Q|)(\log n)^{O(1)})$. However, in applications of the present invention, typically $d_k \le u(P)$, so that the shortest path calculation at each step is also a minimum cost flow computation. Since minimum cost flow computations require fewer iterations, this gives an improved bound on the run time of $O(\epsilon^2 m|Q||\Lambda|^3(\log n)^{O(1)})$. For support that minimum cost flow computations require fewer iterations, see, for example, Garg, Section 5, or Grigoriadis et al., "Fast Approximation Schemes for Convex Programs With Many Blocks and Coupling Constraints," Society of Industrial and Applied Mathematics (SIAM) J. on Optimization, 4:86-107 (1996), the disclosure of which is hereby incorporated by reference.

2. Concurrent Recovery With Budget Constraint

One motivation for studying the problem in the preceding section is to develop a framework for quickly obtaining feasible solutions to (MOC). In fact, network designers are often interested in integer solutions where every commodity is assigned one regular path and one backup path. This latter problem is NP-hard although one can obtain near-optimal solutions by rounding a solution to the linear program relaxation, e.g., one of the $\epsilon$-approximate solutions.

This section addresses the full version of the problem (MOC) where the method of the previous section is modified to reserve bandwidth on links (not exceeding their capacity) which supports a routing and recovery solution as given in the previous section. The techniques of the previous section are only marginally suitable to obtain $\epsilon$-approximate solutions to (MOC). Instead, in this section, an alternate approach is considered. Instead of searching for the minimum cost bandwidth, the view is taken in this section that bandwidth is paid for as the method progresses. In this setting, backup capacity is paid for only as often as failures dictate that this capacity be purchased. In this sense, a minimum cost multicommodity flow and recovery problem may be formulated as follows.

Assume that, for each commodity k and paths $P_1, P_2 \in \Lambda_k$, there is given a cost $c(P_1, P_2)$ whose interpretation is as follows. If $P_1 = P_2$, then this is the per-unit cost of sending flow on the path. Otherwise, this is the per-unit cost of sending backup flow for $P_1$ on path $P_2$. Note that these constants may be hard-wired in advance to account for known statistical information about network failures. For instance, if it is possible to determine a value k(P) for each path P which indicates the percentage of time P is in a non-failed state, then setting $c(P_1, P_2) = (1-k(P))\Sigma_{e \in P_2} c(e)$ represents the total cost of backup flow on $P_2$ for $P_1$. Similarly, $c(P,P) = k(P)\Sigma_{e \in P_2} c(e)$ represents the total cost of primary flow on path P. Henceforth, set $c(P) := c(P,P)$ and this notation should not be confused with its prior meaning. This new objective function is then:

$$\min \sum_k \left( \sum_{P \in P_k} c(P)x(P) + \sum_{P_1 \in P_k \setminus P} c(P_1, P)y^{P_1}(P) \right). \quad (8)$$

Lemma 2.1: Let $(x^*, y^*, f^*)$ be a solution that minimizes $\Sigma_e f(e)c(e)$, and let $(\tilde{x}, \tilde{y}, \tilde{f})$ be a solution that minimizes Eq. (8). If there is a constant $1 \leq \xi$ that $c(P) \leq \xi c(P')$ for all pairs $P, P' \in P_k$ and all choices of $k \in K$, then $\Sigma_e \tilde{f}(e)c(e) \leq (1+\xi)\Sigma_e f^*(e)c(e)$.

Proof: The following can be shown.

$$\sum_e \tilde{f}(e)c(e) \leq \sum_P c(P)\left[\tilde{x}(P) + \sum_{P'} \tilde{y}^{P'}(P)\right] \leq$$

$$\sum_P c(P)\left[x^*(P) + \sum_{P'} y^{*P'}(P)\right] \leq$$

$$(1+\xi)\sum_P c(P)x^*(P) \leq (1+\xi)\sum_e f^*(e)c(e).$$

Thus, optimizing one choice of objective function provides a solution for which the value of the second objective function is close to optimal. In practice, the solution obtained using the proxy objective function should be much closer than the worst case bound given by this analysis. In particular, the first, third, and fourth inequalities are likely to be far from tight. For the third inequality, this is because $\xi$ may be large when $c(P)$ is very small for some P, but in this case, the total contribution to Eq. (8) of the capacity reserved on P is also small. When $c(P)$ is large for some commodity, then the other paths for that commodity should also be close in cost. In addition, since in the end the fractional solutions are rounded to obtain integer solutions, the gain in cost due to using the proxy objective function is small relative to the gain from rounding.

The minimum cost version need not be solved directly, but the maximum concurrent flow LP may be solved with an additional budget constraint. With an $\epsilon$-approximate method for this problem, one can obtain an approximate minimum cost solution by using an efficient search method (such as binary search) to find the minimum cost budget.

The budgeted linear program (referred to as BCR, for Budgeted Concurrent Recovery) and the corresponding dual linear program (DBCR) are now presented.

$$\sum_{P \in P_k} x(P) \geq \lambda d_k \, \forall \, k \in K$$

$$\sum_{P \in \Lambda_k \setminus P''} \left[x(P) + y^{P'}(P)\right] \geq \lambda d_k \, \forall \, P' \in \Lambda_k, \forall \, k \in K$$

$$\sum_{k \in K} \sum_{\substack{P: e \in P \\ P \in \Lambda_k \setminus \Lambda(q)}} \left[x(P) + \sum_{P' \in \Lambda_k \cap \Lambda(q)} y^{P'}(P)\right] \leq u(e) \forall \, e \in E,$$

$$\forall \, q \in Q$$

$$\sum_{k \in K} \sum_{P \in \Lambda_k} \left[c(P)x(P) + \sum_{P' \in \Lambda_k \setminus P} c(P', P)y^{P'}(P)\right] \leq B$$

$x, y, \lambda \geq 0$.

The dual (DCBR) of this linear program is the following:

$$\min \varphi B + \sum_{e \in E} u(e) \sum_{q \in Q} h^q(e)$$

$$c(P', P)\varphi + \sum_{q: P' \in \Lambda(q)} \sum_{e \in P} h^q(e) \geq w^{P'} \, \forall \, k \in K,$$

$$\forall \, P', P \in \Lambda_k, P \neq P'$$

$$c(P)\varphi + \sum_{q: P \notin \Lambda(q)} \sum_{e \in P} h^q(e) \geq z_k + \sum_{P' \in \Lambda_k - \{P\}} w^{P'} \, \forall \, P \in \Lambda_k,$$

$$\forall \, k \in K$$

$$\sum_{k \in K} d_k z_k + \sum_{k \in K} \sum_{P' \in \Lambda_k} d_k w^{P'} \geq 1$$

$\varphi, h, w, z \geq 0$

For ease of notation in the following, if $f$ is a linear function defined on ground set E and $P \subset E$, then $f(P)$ will be used to denote $\Sigma_{e \in P} f(e)$.

2.1 An Exemplary Method for Budgeted Concurrent Recovery

The problem (BCR) is a mixed packing and covering linear program: it has form max $\lambda$, $Px \leq p$, $Cx \geq \lambda c$, $x \geq 0$ for nonnegative matrices P and C and positive vectors p and c. Start with $x, y \equiv 0$, $h^q(e) = \delta/u(e)$, and $\phi = \delta/B$. Given a singleton-vector pair $(\phi, h)$, let $\mu_P(\phi, h)$ and $V_{P',P}(\phi, h)$ be defined as follows:

$$\mu_P(\varphi, h) := c(P)\varphi + \sum_{q: P \notin P(q)} h^q(P),$$

$$v_{P', P}(\varphi, h) := c(P', P)\varphi + \sum_{q: P' \in P(q)} h^q(P).$$

When $\Phi$ and h are clear from context, they are written as $\mu_P$ and $V_{P',P}$. The variables $z_k$ and $W^{P'}$ are obtained for $P' \in \Lambda_k$ by finding an optimal solution to the following new linear program, where the constraint (10) is supposed to hold for all P, $P' \in \Lambda_k$, $P \neq P'$:

$$\max d_k \left[ z_k + \sum_{P' \in \Lambda_k} w^{P'} \right] \quad (9)$$

$$w^{P'} \leq V_{P',P} \quad (10)$$

$$z_k + \sum_{P' \in \Lambda_k - \{P\}} w^{P'} \leq \mu_P \, \forall \, P \in \Lambda_k \quad (11)$$

$$z, w \geq 0 \quad (12)$$

Let $Z_k$ be the optimal value of this problem; that is, $Z_k = z_k + \Sigma_{P \in \Lambda_k} W^P$. By dividing the solution $(\phi, h, w, z)$ by $\Sigma_k d_k Z_k$, a feasible solution is obtained to (DBCR). Thus for now, the main concern is with only dual variables h and $\Phi$.

As with the previous method, the method for the budgeted concurrent recovery problem cycles through the commodities. For commodity k, using current vectors $h_{l,k-1}$ and $\phi_{l,d-1}$, an optimal solution to the following problem is found, and this solution is used to determine the update step in the current iteration (the second of the following three constraints is supposed to hold for all $P' \in \Lambda_k$):

$$\min \sum_{P \in \Lambda_k} \mu_P x(P) + \sum_{(P,P') \in \Lambda_k^2} v_{P',P} y^{P'}(P)$$

subject to the following:

$$\sum_{P \in \Lambda_k} x(P) \geq d_k$$

$$\sum_{P \in \Lambda_k; P \neq P'} x(P) + \sum_{P \in \Lambda_k, P \neq P'} y^{P'}(P) \geq d_k$$

$$x, y \geq 0$$

Note that the linear program described by Eqs. (9)-(12) is the dual of Eq. (13). The optimal solutions to both problems take one of two forms. The structure of the optimal solution to both Eq. (13) and Eqs. (9)-(12) is described in Lemma 2.2. To begin, two functions are introduced that will be useful to demonstrate this. The first is an extension of the $Z_k$ introduced in the previous section.

$$\overline{Z}_k = \min_{P_1, P_2 \in \Lambda_k : P_1 \neq P_2} \mu_{P_1} + v_{P_1, P_2} \quad (14)$$

To obtain the second, assume the $P_i \in \Lambda_k$ are indexed by increasing $\mu_{P_1}$, value, so that $\mu_{P_1} \leq \mu_{P_2} \leq \ldots$.

$$\hat{Z}_k = \min_{2 \leq r \leq |\Lambda_k|} (\sum_{i=1}^{r} \mu_{P_1} / (r-1)) \quad (15)$$

Let $r_k$ be the value of r that determines $\hat{Z}_k$ in this expression.

Lemma 2.2: The optimal solution to Eq. (13) has value equal to $d_k \min\{\overline{Z}_k, \hat{Z}_k\}$. If the optimal solution has value $d_k \tilde{Z}_k$ determined by $P_1$ and $P_2$, then it satisfies $x(P_1)=y^{P_1}(P_2)=d_k$, with all other variables zero. Otherwise, it has value $d_k \hat{Z}_k$ and there are r distinct paths in $\Lambda_k$ such that $$x(P_i) = \frac{d_k}{r-1}$$

for i=1, . . . , r, all other variables are zero.

Proof: $\hat{Z}_k \leq \overline{Z}_k$: In this case, it is claimed that $$x(P_i) = \frac{d_k}{r_k - 1}$$

for $i \leq r_k$ for $r_k$ the value that determines $\hat{Z}_k$, and $x(P_i)=0$ for $i>r_k$ is an optimal solution. This is clearly feasible and has value $d_k \hat{Z}_k$. Now consider the dual solution $w(P_i)=\hat{Z}_k-\mu_i$ if $i \leq r_k$ and $Z_k=0$. This clearly satisfies Eq. (11). By Lemma 2.3, $w(P_i) \geq 0$ for all i, satisfying Eq. (12). Since $\hat{Z} \leq \overline{Z}_k \leq \mu P_i + v_{P_i,P_j}$, then Eq. (10) is satisfied for all P,P'. Thus, the solution is feasible. Since its value is $d_k \hat{Z}_k$, matching the value of the above solution to Eq. (13), both primal and dual solutions are optimal.

$\overline{Z}_k \leq \hat{Z}_k$: If $\overline{Z}_k = \mu_{P_1} + v_{P_1, P_2}$ set $x(P_1)=y^{P_1}(P_2)=d_k$ and all other primal variables equal to 0. This solution is clearly feasible and has value $d_k \overline{Z}_k$. Consider the following dual solution.

$$w(P_i) = \max\{Z_k - \mu_{P_1}, 0\} \forall i \leq |\Lambda_k| \quad (16)$$

and $z_k = \overline{Z}_k - \Sigma_i w(P_i)$. Since $\overline{Z}_k \leq \hat{Z}_k$, Lemma 2.3 implies that $\overline{Z}_k \leq \mu_p$ for all $w(P)=0$, and hence this solution satisfies Eq. (11). By definition, w is nonnegative. Summing Eq. (16) over all i with $w(P_i) > 0$ yields $\Sigma w(P_i) = r\overline{Z}_k - \Sigma \mu_{P_i}$, which implies that $z_k = \overline{Z}_k - \Sigma w(P_i) = \Sigma \mu_{P_i} - (r-1)\overline{Z}_k \geq \Sigma \mu_{P_i} - (r-1)\hat{Z}_k \geq 0$, where the second inequality follows from the definition of $\hat{Z}_k$. Finally, $\overline{Z}_k \leq \mu_{P_i} + v_{P_i, P_j}$ for all i and j. Hence Eq. (10) is satisfied, and the solution is feasible. It has value $d_k \overline{Z}_k$, matching the given solution to its dual Eq. (13), hence both are optimal.

Lemma 2.3: $\hat{Z}_k \geq \mu_{P_i}$ for $i \leq r_k$ and $\hat{Z}_k \leq \mu_{P_i}$ for $i > r_k$.

Proof:

$$\text{Let } \hat{Z}_k(r) := \frac{1}{r-1} \sum_{i=1}^{r} \mu_{P_i}.$$

For ease of notation, $\mu_{P_i}$ is written as $\mu_i$ for the remainder of the proof. The lemma follows by noting that $\hat{Z}_k(r+1)$ is a convex combination of $\hat{Z}_k(r)$ and $\mu_{r+1}$. Thus, $\mu_i$ for $i>2$ is included in definition of $\hat{Z}_k$ if and only if $\mu_i \leq \hat{Z}_k(i-1)$. Since $\mu_i \leq \mu_j$ for $i<j$, if $\mu_i \leq \hat{Z}_k(i-1)$, then $\mu_i \leq \hat{Z}_k(j)$ for all $j>i$.

Lemma 2.2 implies that the optimal solution to Eq. (13) may be described as a set of paths, each carrying an equal amount of flow. Without loss of generality, assume this set is $\{P_1, \ldots, P_{r_k}\}$, where $r_k \geq 2$. (If $\overline{Z}_k < \hat{Z}$, this set is $\{P_1, P_2\}$ and $r_k=2$.) The amount of flow sent along each path is u where $$u := \min\left\{\frac{d_k}{r_k - 1}, \min_{i \leq r_k} u(P_i), \frac{B}{\sum_{i=1}^{r_k} c(P_i)}\right\}.$$

This quantity u is set so that the left side of an inequality in (BCR) does not increase by more than the fixed value of the right side in any one step. In practice, $\Sigma_{P \in \Lambda_k} c(P)$ is significantly smaller than B, so that, when combined with scaling of capacities, u is determined by $d_k$. The updates to the dual variables for each case are described in the method given below. The stopping criterion is the same as in Garg, which is incorporated by reference above.

---

Budget-LP (G = (Λ, E, c, u, d))
Initialize $h^q(e) = \delta/u(e)$ $\forall e \in E$, $\forall q \in Q$
Initialize $\phi = \delta/B$
Initialize $x \equiv 0$, $y \equiv 0$
while D(h) < 1
    for k = 1 to |K| do
d' ← $d_k$
while D(h) < 1 and d' > 0

$Z_k = \min\{\overline{Z}_k, \hat{Z}_k\}$.

Let $\{P_1, P_2, \ldots, P_{r_k}\}$ be paths achieving the optimum $Z_k$.

-continued $$C \leftarrow \frac{B}{\sum_{i=1}^{r_k} c(P_i)}$$

$$u_0 \leftarrow \min\left\{\frac{d'}{r_k - 1}, \min_{1 \le i \le r_k, e \in P_i} u(e), C\right\}$$

$$\varphi \leftarrow \varphi e^{\frac{\varepsilon u_0}{C}}$$

$$d' \leftarrow d' - (r_k - 1)u_0$$

if $Z_k = \overline{Z}_k$, $\quad x(P_1) \leftarrow x(P_1) + u_0$ $\quad y^{P_1}(P_2) \leftarrow y^{P_1}(P_2) + u_0$ $\quad$ for $q \in Q$ $\quad\quad$ if $P_1 \in \Lambda(q)$ do $\quad\quad\quad \forall e \in P_1, h^q(e) \leftarrow h^q(e)e^{\frac{\varepsilon u_0}{u(e)}}$.

$\quad\quad$ else do $\quad\quad\quad \forall e \in P_2, h^q(e) \leftarrow h^q(e)e^{\frac{\varepsilon u_0}{u(e)}}$.

$\quad$ end for else ($Z_k = \hat{Z}_k$), $\quad$ for $i \le r_k$, $\quad\quad x(P_i) \leftarrow x(P_i) + u_0$ $\quad\quad$ for $e \in P_i$, $q$ such that $P_i \in \Lambda(q)$, $\quad\quad\quad h^q(e) \leftarrow h^q(e)e^{\frac{\varepsilon u_0}{u(e)}}$.

$\quad\quad$ end for $\quad$ end for end while end while

2.2 Analysis

The extended arguments for $$\lambda > \frac{t-1}{\log_e(1/\delta)}$$

are similar to the previous arguments. It is now shown that the primal solution divided by this choice of $\lambda$ after $t$ iterations is indeed an $\epsilon$-approximate solution.

Theorem 2.4: Suppose the optimal primal (and hence dual) solution value is at least 1. The primal solution at the end of the $(t-1)$st iteration divided by $\log_e 1/\delta$ is an $\epsilon'$-approximate solution, for $\epsilon'=c\epsilon$, for an appropriate constant $c>0$, and appropriate choice of $\delta$.

Proof: Let $h_i$ and $\Phi_i$ be the dual variables at the beginning of the $i^{th}$ iteration. Let $h_{i,k,s}$ and $\phi_{i,k,s}$ be the dual variables before routing the $k^{th}$ commodity in the $i^{th}$ iteration. Let $h_{i,k,s}$ and $\phi_{i,k,s}$ be the dual variables before routing the $s^{th}$ pair of paths for commodity k in the $i^{th}$ iteration. Let D(i,k,s) be the value of the dual objective function using dual variables $h_{i,k,s}$ and $\phi_{i,k,s}$.

Let $Z_k(h,\phi)$ be the value of $Z_k$ computed using the given values of h and $\Phi$ before the rescaling necessary to make the dual feasible. Equivalently, $Z_k(h,\phi)=\min\{\overline{Z}_k(h,\phi),\hat{Z}_k(h,\phi)\}$. Let $\alpha(h,\phi)$ equal $\Sigma_{k \in K} d_k Z_k(h,\phi)$. The variable $\alpha$ has been designed so that $(h,\phi)$ divided by $\alpha(h,\phi)$ is a feasible dual solution with value $D(h,\phi)/\alpha(h,\phi)$. Let D(i,k,s) be the value of the dual solution with variables $h_{i,k,s}$ and $(\phi_{i,k,s}$. Below, it is established that $$D(i,k,s+1) \le D(1,k,s) + u\epsilon(1+\epsilon)Z(h_{i,k,s},\phi_{i,k,s}) \quad (17)$$

holds no matter how $Z_k$ is determined. This is done by analyzing each case separately. Once Eq. (17) is established, the remaining argument mirrors the argument in the proof of Theorem 1.2, so this portion of the proof is omitted here.

Suppose $Z_k(h_{i,k,s},\phi_{i,k,s})=\overline{Z}_k(h_{i,k,s},\phi_{i,k,s})$ Let S and S' be as in Eqs. (3) and (4). After u is routed on $P_1$ and $P_2$ as the $s^{th}$ pair of primary and backup paths for commodity k, the following may be determined:

$$D(i,k,s+1) = B\varphi_{i,k,s+1} + \sum_{e \in E} u(e) \sum_{q \in Q} h^q_{i,k,s+1}(e)$$

$$= D(i,k,s) + B\varphi_{i,k,s}(e^{\epsilon \cdot u \cdot (c(P_1)+c(P_2))/B} - 1) +$$

$$\sum_{(e,q) \in S} u(e) h^q_{i,k,s}(e)(e^{\epsilon u/u(e)} - 1) +$$

$$\sum_{(e,q) \in S'} u(e) h^q_{i,k,s}(e)(e^{\epsilon u/u(e)} - 1).$$

Thus, letting $\gamma \equiv c(P_1)+c(P_2)$, the following may be determined:

$$D(i,k,s+1) \le D(i,k,s) + \epsilon u \gamma \phi_{i,k,s} + \epsilon^2 u^2 \gamma^2/B + \quad (18)$$

$$\sum_{(e,q) \in S} h^q_{i,k,s}(e)(u\epsilon + \epsilon^2 u^2/u(e)) + \sum_{(e,q) \in S'} h^q_{i,k,s}(e)(u\epsilon + \epsilon^2 u^2/u(e)) \le \quad (19)$$

$$D(i,k,s) + u\epsilon(1+\epsilon)\varphi_{i,k,s}\gamma + u\epsilon(1+\epsilon) \sum_{(e,q) \in (S \cup S')} h^q_{i,k,s}(e)$$

$$= D(i,k,s) + u\epsilon(1+\epsilon)[\mu_{P_1} + v_{P_1 P_2}] \quad (20)$$

$$= D(i,k,s) + u\epsilon(1+\epsilon)Z(h_{i,k,s},\varphi_{i,k,s}),$$

where inequality (18) uses the fact that $e^a \le 1+a+a^2$ for $0 \le a \le 1$; inequality (19) uses the fact that $$u \le \min\left\{u(P_1), u(P_2), \frac{B}{c(P_1)+c(P_2)}\right\};$$

and inequality (20) follows from the determination of $Z_k$ as in (14).

Next, suppose $Z_k(h_{i,k,s},\phi_{i,k,s})=\hat{Z}_k(h_{i,k,s},\phi_{i,k,s})$. For ease of notation, the following are defined:

$$S'' \equiv \bigcup_{j=1}^{r} \{(e,q) : e \in P_j, P_j \notin \Lambda(q)\}; \quad (21)$$

$$\psi \equiv \epsilon u \cdot \left(\sum_{j=1}^{r} c(P_j)\right) \bigg/ (r-1), \text{ and}$$

$$\eta \equiv u\eta/(r-1).$$

(Note that the union in Eq. (21) is a union of r pairwise disjoint sets, since the paths $P_j$ are pairwise link-disjoint.) After $u/(r-1)$ is routed in the $i^{th}$ iteration in the $s^{th}$ round for commodity k on the cheapest $r_k$ paths determined by $\hat{Z}k$, the following may be developed:

$$D(i,k,s+1) = B\varphi_{i,k,s+1} + \sum_{e \in E} u(e) \sum_{q \in Q} h^q_{i,k,s+1}(e) \quad (22)$$

$$= D(i,k,s) + B\varphi_{i,k,s}(e^{\varepsilon u/C} - 1) +$$

$$\sum_{(e,q) \in S''} u(e) h^q_{i,k,s}(e)(e^{\eta/u(e)} - 1) \le$$

$$D(i,k,s) + \varphi_{i,k,s}(\psi + \psi^2/B)) +$$

$$\sum_{(e,q) \in S''} h^q_{i,k,s}(e)(\eta + \eta^2/u(e))$$

$$\le D(i,k,s) + \eta(1+\varepsilon) \sum_{j=1}^{r} \mu P_j(\varphi_{i,k,s}, h_{i,k,s}) \quad (23)$$

where inequality (22) uses the fact that $e^a \le 1+a+a^2$ for $0 \le a \le 1$; inequality (20) uses the fact that $u \le \min\{(r-1)u(P_j), C\}$; and inequality (24) follows from the determination of $\hat{Z}_k$ as in (15), the fact that $Z_k = \hat{Z}_k$, and the choice of r and $P_j$.

3. Commodity-Dedicated Capacity Reservation

In this section, a simplified version of (MOC) is considered that insists on dedicated reserve capacity for each commodity. In (MOC), capacity used by a backup path for a failure affecting commodity k could be used by a different commodity when a different failure occurs. This more sophisticated model allows for better utilization of network capacity. In current network models, however, this is not done. Instead, each commodity has dedicated reserve capacity. That is, if any path fails, then there is enough spare capacity reserved for that commodity to route all the demand for that commodity. Since there is no transfer of flow from one path to another in case of failure, another commonly used objective function is considered here: letting ƒ(e) be the total flow on link e, the total cost of the flow, i.e., $\Sigma_{e \in E} c(e) f(e)$, is minimized. This problem and its variant, where the paths are chosen on the fly, has been studied by Bienstock and Muratore in the context of capacity expansion with integrality constraints. See Bienstock and Muratore, "Strong Inequalities for Capacitated Survivable Network Design Problems," Math. Programming 89, 127-147 (2001), the disclosure of which is hereby incorporated by reference.

An ε-approximation scheme is described here to solve the corresponding linear program for this dedicated reservation problem by observing that this problem corresponds to the special case of the previous problem with all y variables forced to zero. In this case, $Z_k$ is always determined by $\hat{Z}_k$. Likewise, the $h^q(e)$ variables are replaced by a single variable h(e), and $z_k = 0$ so may also be omitted. This modification in linear program formulation is highlighted below. The method and analysis then follow from the previous section, so are omitted. The dedicated capacity concurrent recovery problem:

$$\min \sum_{e \in E} c(e) f(e) \quad (25)$$

$$\sum_{P \in \Lambda_k \setminus \{P'\}} x(P) \ge d_k \quad \forall k \in K, P' \in \Lambda_k$$

$$\sum_{P: e \in P} x(P) \le f(e) \quad \forall e \in E$$

$$f(e) \le u(e) \quad \forall e \in E$$

$$x(P) \ge 0$$

It is possible to remove the variables ƒ(e) from this formulation to obtain an equivalent formulation:

$$\min \sum_{P \in \Lambda} c(P) x(P)$$

$$\sum_{P \in \Lambda_k \setminus \{P'\}} x(P) \ge d_k \quad \forall k \in K, P' \in P_k \Lambda$$

$$\sum_{P: e \in P} x(P) \le u(e) \quad \forall e \in E$$

$$x(P) \ge 0$$

This is solved by solving the concurrent flow version with a budget constraint and then searching for the optimal budget. The corresponding primal and dual LP's are $$\max \lambda d_k$$

$$\sum_{P \in \Lambda_k \setminus \{P'\}} x(P) \ge \lambda \quad \forall k \in K, P' \in \Lambda_k$$

$$\sum_{P: e \in P} x(P) \le u(e) \quad \forall e \in E$$

$$\sum_{P \in \Lambda} c(P) x(P) \le B$$

$$x(P) \ge 0$$

The dual LP is as follows, where the first constraint is supposed to hold for all $k \in K$ and for all $P \in \Lambda_k$:

$$\min B\phi + \sum_{e \in E} u(e) h(e)$$

$$c(P)\varphi + \sum_{e \in P} h(e) \ge \sum_{P' \in \Lambda_k \setminus \{P\}} w^{P'}$$

$$\sum_{k \in K} d_k \sum_{P \in \Lambda_k} w^P \ge 1$$

$$l, w \ge 0$$

Substituting $Z_k = \Sigma_{P \in \Lambda_k} w^P$, then the dual can be rewritten as follows (once again, with the first constraint is supposed to hold for all $k \in K$ and for all $P \in \Lambda_k$):

$$\min B\varphi + \sum_{e \in E} u(e) h(e)$$

$$w^P + c(P)\varphi + h(P) \ge Z_k$$

$$\sum_{k \in K} d_k Z_k \ge 1$$

$$l, w \ge 0$$

As mentioned above, the algorithm and analysis now follow from the previous section.

It is to be understood that the embodiments and variations shown and described herein are merely illustrative of the principles of this invention and that various modifications may be implemented by those skilled in the art without departing from the scope and spirit of the invention.

We claim:

1. A method for determining routing in a network to achieve an objective value within a prescribed bound from its minimum value, the network comprising a plurality of nodes interconnected through links, the method comprising:
   concurrently routing demands for each of a plurality of commodities on a set of paths having a minimum cost with respect to an iteratively changing cost function, each set of paths comprising at least one primary path and a secondary path, wherein each of the demands is routed from a primary path to a secondary path of the set during a failure;
   adjusting link costs using an exponential function based on an amount of flow through links over which each demand is routed and based on said at least one primary path and said secondary path;
   performing the step of adjusting for each of a number of potential failures; and
   iterating the steps of routing, adjusting, and performing until an objective value is reached which is within a prescribed bound of a pre-determined value, such that flow for each of the links in the network is determined.

2. The method of claim 1, wherein the step of routing further comprises the step of minimizing a function that represents a marginal cost of a link when the network is in a particular state, wherein the function is minimized for both the at least one primary path and the at least one secondary path.

3. The method of claim 1, wherein:
   the step of routing further comprises the step of routing a flow for one of the commodities on a set of paths having a minimum cost, the set of paths comprising at least one primary path and at least one secondary path, wherein the flow is routed from a primary path to a secondary path during a failure;
   the step of adjusting further comprises the step of adjusting a minimum total cost using an exponential function based on an amount of flow through links over which the flow is routed; and
   the method further comprises the step of iterating the steps of routing and adjusting until the demand for the commodity is routed.

4. The method of claim 1, wherein the step of performing the step of adjusting further comprises the step of determining a backup flow strategy comprising specifying, for each failure, how much flow for a primary path gets re-routed to one or more secondary paths.

5. The method of claim 4, wherein the backup flow strategy comprises allowing secondary paths to be shared, secondary paths to be dedicated, or secondary paths to be shared and dedicated.

6. The method of claim 4, wherein the objective value is a total expected cost of flow in the network over a predetermined time period, wherein the expected cost is taken over a probability distribution that includes the failures, and wherein the backup flow strategy is created wherein flows for any failure is recovered by routing the flows through secondary paths.

7. The method of claim 1, further comprising the step of computing a number of iterations after which the objective value is within a specified tolerance from an optimum objective value.

8. A method for determining routing in a network comprising a plurality of nodes interconnected through links, to achieve an objective value within a prescribed bound from its minimum value, the method comprising:
   setting costs for each link in the network;
   initializing primary and secondary flows for each link to at least one predetermined value;
   selecting a commodity, said commodity comprising a source-sink pair and having a demand;
   routing a demand through the network for the selected commodity;
   updating costs for links over which the demand is routed, wherein said updating is based on said primary flows and said secondary flows; and
   performing the steps of selecting, routing, and updating until a value of an objective function is at least as much as a prescribed bound of a pre-determined value.

9. The method of claim 8, wherein the step of performing the steps of selecting, routing, and updating until a value of an objective function is at least as much as a prescribed bound of a pre-determined value further comprises the step of performing the steps of selecting, routing, and updating until an approximate solution to the network routing is within a predetermined error from an optimum network routing.

10. The method of claim 8, wherein the objective function is a dual objective function.

11. The method of claim 10, wherein the dual objective function is part of a linear program designed to maximize a first variable of the dual objective function subject to a first plurality of conditions.

12. The method of claim 11, wherein there is also a second objective function as part of a second linear program, the second linear program designed to minimize a variable of the second objective function subject to a second plurality of conditions, and wherein the method further comprises the step of using the second objective function to determine if the value of the dual objective function is correct.

13. The method of claim 8, wherein the step of updating costs further comprises the step of, for each of a plurality of failure conditions and for each link over which demand is routed, updating costs using an exponential function.

14. The method of claim 13, wherein the step of updating costs using an exponential function further comprises the steps of:
   determining if the primary flow is part of a set of paths affected by the failure condition;
   for all links that are part of the primary flow, updating costs for these primary flow links using the exponential function when the primary flow is part of a set of paths affected by the failure condition; and
   for all links that are part of the secondary flow, updating costs for these secondary flow links using the exponential function when the primary flow is part of a set of paths affected by the failure condition.

15. The method of claim 13, wherein the exponential function is the following:
$$e^{\epsilon u/u(e)},$$
wherein $\epsilon$ is the predetermined error, u is an amount of flow currently routed on a link, and u(e) is a capacity of the link.

16. The method of claim 8, wherein the step of routing demand through the network for the selected commodity further comprises the steps of:

for each link over which demand is routed, determining an amount of demand to route on the link;

increasing primary flow by the determined demand; and increasing secondary flow by the determined demand.

17. The method of claim 16, wherein the determined demand is selected by selecting a minimum of one of the following: demand for the commodity; a capacity of a primary amount of demand; and a capacity of a secondary amount of demand.

18. The method of claim 8, wherein the step of setting costs for each link in the network further comprises the step of setting costs for each link in the network by setting a cost for a link equal to a predetermined delta value divided by a capacity of the link.

19. The method of claim 18, wherein the predetermined delta value is the following:

$$(m|Q|/(1-\epsilon))^{-1/\epsilon},$$

where m is a number of links in the network, $|Q|$ is a number of failure conditions, and $\epsilon$ is the predetermined error.

20. The method of claim 8, further comprising the steps of setting a desired budget and setting a current budget to a predetermined budget, and wherein the step of performing the steps of selecting, routing, and updating until a value of an objective function is at least as much as a prescribed bound of a pre-determined value further comprises the steps of selecting, routing, updating, and modifying the current budget until the value of the objective function is at least as much as the pre-determined value.

21. An apparatus for determining routing in a network to achieve an objective value within a prescribed bound from its minimum value, the network comprising a plurality of nodes interconnected through links, the apparatus comprising:

a memory that stores computer-readable code;

a processor operatively coupled to the memory, the processor configured to execute the computer-readable code, the computer-readable code configured to:

concurrently route demands for each of a plurality of commodities on a set of paths having a minimum cost with respect to an iteratively changing cost function, each set of paths comprising at least one primary path and a secondary path, wherein each of the demands is routed from a primary path to a secondary path of the set during a failure;

adjust link costs using an exponential function based on an amount of flow through links over which each demand is routed and based on said at least one primary path and said secondary path;

perform the step of adjusting for each of a number of potential failures; and iterate the steps of routing, adjusting, and performing until an objective value is reached which is within a prescribed bound of a pre-determined value, such that flow for each of the links in the network is determined.

22. An article of manufacture for determining routing in a network to achieve an objective value within a prescribed bound from its minimum value, the network comprising a plurality of nodes interconnected through links, the article of manufacture comprising:

a computer-readable medium having computer-readable code embodied thereon which when executed implement the steps of:

concurrently routing demands for each of a plurality of commodities on a set of paths having a minimum cost with respect to an iteratively changing cost function, each set of paths comprising at least one primary path and a secondary path, wherein each of the demands is routed from a primary path to a secondary path of the set during a failure;

adjusting link costs using an exponential function based on an amount of flow through links over which each demand is routed and based on said at least one primary path and said secondary path;

performing the step of adjusting for each of a number of potential failures; and iterating the steps of routing, adjusting, and performing until an objective value is reached which is within a prescribed bound of a pre-determined value, such that flow for each of the links in the network is determined.

* * * * *